(12) United States Patent
Maeda et al.

(10) Patent No.: US 8,497,458 B2
(45) Date of Patent: Jul. 30, 2013

(54) PHOTOELECTRIC CONVERSION APPARATUS AND IMAGE PICKUP SYSTEM FOR DETECTING A VALUE OF SIGNALS OUTPUT FROM A PLURALITY OF PIXELS

(75) Inventors: Kouji Maeda, Kawasaki (JP); Tomohisa Kinugasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 323 days.

(21) Appl. No.: 12/884,024

(22) Filed: Sep. 16, 2010

(65) Prior Publication Data

US 2011/0068257 A1 Mar. 24, 2011

(30) Foreign Application Priority Data

Sep. 24, 2009 (JP) .................. 2009-219219

(51) Int. Cl.
*H01L 27/00* (2006.01)
*G03B 13/00* (2006.01)

(52) U.S. Cl.
USPC ..................................... 250/208.1; 348/350

(58) Field of Classification Search
USPC ............. 250/208.1, 214 A, 214 AG; 348/241, 348/349, 350
See application file for complete search history.

(56) References Cited

U.S. PATENT DOCUMENTS 6,781,624 B1    8/2004 Takahashi
8,139,143 B2 *  3/2012 Kinugasa ...................... 348/350

FOREIGN PATENT DOCUMENTS

JP    2000-050164 A    2/2000

\* cited by examiner

*Primary Examiner* — Thanh Luu
(74) *Attorney, Agent, or Firm* — Canon U.S.A., Inc. IP Division (57) ABSTRACT

A photoelectric conversion apparatus is configured to include a plurality of pixels, a first output unit that detects a maximum value of signals output from the plurality of pixels, a second output unit that detects a minimum value of signals output from the plurality of pixels, and a signal output line via which to output signals of the first output unit and the second output unit such that when the maximum value is detected, the signal output line is charged by a source current flowing through the first output unit, while when the minimum value is detected, the signal output line is discharged by a sink current flowing through the second output unit.

14 Claims, 10 Drawing Sheets

PHOTOELECTRIC CONVERSION APPARATUS AND IMAGE PICKUP SYSTEM FOR DETECTING A VALUE OF SIGNALS OUTPUT FROM A PLURALITY OF PIXELS

BACKGROUND OF THE INVENTION

1. Field of the Invention

The present invention relates to a photoelectric conversion apparatus, and more particularly, to a photoelectric conversion apparatus configured to detect a maximum value or a minimum value of signals output from a plurality of pixels.

2. Description of the Related Art

A photoelectric conversion apparatus is known that is used as an autofocus sensor (hereinafter referred to as an AF sensor) for a camera and that has a function of detecting a maximum value and a minimum value of signals output from a plurality of pixels. In a configuration in which all pixels in one row are connected to an output line via a voltage follower of each pixel, it is known to output the maximum value or the minimum value by simultaneously connecting all voltage followers in one row to the output line, as disclosed in Japanese Patent Laid-Open No. 2000-050164.

In the AF sensor, there is a need for higher performance of focusing operation in terms of accuracy and operation speed. To meet the need for higher accuracy of focus, there is a tendency to provide a greater number of pixels in the AF sensor. However, the increase in the number of pixels leads to an increase in the length of the output line and an increase in the number of elements connected to the output line. This results in an increase in parasitic impedance associated with the output line, which leads to an increase in time to charge and discharge the output line. Thus, a reduction occurs in response speed of signal output.

SUMMARY OF THE INVENTION

According to an aspect, the present invention provides an apparatus comprising a plurality of pixel output units each including a pixel configured to output a signal in response to incident light and including at least one of first and second output units, an output line connected to a plurality of first output units via a first switch and connected to a plurality of second output units via a second switch, a reference output unit configured to output a reference signal to the output line, and a control unit configured to control an operation of the plurality of pixel output units and an operation of the reference output unit, wherein each first output unit includes a first transistor that functions to raise an electric potential of the output line in accordance with an output from the pixel, and each second output unit includes a second transistor that functions to lower the electric potential of the output line in accordance with the output from the pixel, and wherein the control unit controls the operation such that the reference signal is output from the reference output unit, the plurality of first switches are turned on at the same time to output a signal with a higher level than the reference signal from the first transistor, and thereafter, the plurality of second switches are turned on at the same time to output, from the second transistor, a signal with a lower level than the signal output from the first transistor.

According to another aspect, the present invention provides an apparatus comprising a plurality of pixel output units each including a pixel configured to output a signal in response to incident light and including at least one of first and second output units, an output line connected to a plurality of first output units via a first switch and connected to a plurality of second output units via a second switch, a reference output unit configured to output a reference signal to the output line, and a control unit configured to control an operation of the plurality of pixel output units and an operation of the reference output unit, wherein each first output unit includes a first transistor that functions to raise an electric potential of the output line in accordance with an output from the pixel, and each second output unit includes a second transistor that functions to lower the electric potential of the output line in accordance with the output from the pixel, and wherein the control unit controls the operation such that the reference signal is output from the reference output unit, the plurality of second switches are turned on at the same time to output a signal with a lower level than the reference signal from the second transistor, and thereafter, the plurality of first switches are turned on at the same time to output, from the first transistor, a signal with a higher level than the signal output from the second transistor.

Further features of the present invention will become apparent from the following description of exemplary embodiments with reference to the attached drawings.

DESCRIPTION OF THE EMBODIMENTS

First Embodiment

A first embodiment of the present invention is described below with reference to FIGS. 1 and 2.

A photoelectric conversion apparatus 100 includes a plurality of pixel signal output units 110, a plurality of maximum value detection switches 117, a plurality of minimum value detection switches 120, a load unit 102, and a third output unit 106. Each pixel signal output unit 110 includes a pixel 101, a first output unit 103, and a second output unit 104. The photoelectric conversion apparatus 100 further includes a control unit (not shown) that controls the pixel signal output units 110, the maximum value detection switches 117 serving as first switches, the minimum value detection switches 120 serving as second switches, and the load unit 102.

The pixels 101 are arranged in a line, and each pixel 101 includes a photoelectric conversion element 113, a reset switch 112, and a differential amplifier 114. In the present embodiment, a photodiode is used as each photoelectric conversion element 113. Each photodiode is connected such that a cathode thereof is connected to a power supply VDD, while an anode thereof is connected to a reset power supply VRES via a reset switch 112 and also connected to a non-inverting input terminal of a differential amplifier 114. Although the differential amplifier 114 is used as a voltage source follower in the present embodiment, other types of amplifiers may be used.

The first output unit 103 includes a differential amplifier 115 and a maximum value detection NMOS transistor 116. The differential amplifier 115 is configured such that a signal output from the pixel 101 is input to a non-inverting input terminal of the differential amplifier 115. An output terminal of the differential amplifier 115 is connected to a gate terminal of the maximum value detection NMOS transistor 116. A drain terminal of the maximum value detection NMOS transistor 116 is connected to the power supply VDD. A source terminal of the maximum value detection NMOS transistor 116 is connected to an inverting input terminal of the differential amplifier 115 and to the maximum value detection switch 117.

The second output unit 104 includes a differential amplifier 118 and a minimum value detection PMOS transistor 119. The differential amplifier 118 is configured such that a signal output from the pixel 101 is input to a non-inverting input terminal of the differential amplifier 118. An output terminal of the differential amplifier 118 is connected to a gate terminal of the minimum value detection PMOS transistor 119. A drain terminal of the minimum value detection PMOS transistor 119 is connected to the power supply VDD. A source terminal of the minimum value detection PMOS transistor 119 is connected to an inverting input terminal of the differential amplifier 118 and also to the minimum value detection switch 120.

The first output unit 103 is connected to an output line 141 serving as a signal output line via the maximum value detection switch 117, and the second output unit 104 is connected to the output line 141 via the minimum value detection switch 120.

The load unit 102 includes load resistors 142-1 and 142-2 and load switches 143 and 144. One end of the load resistor 142-1 is connected to the ground GND and the other end thereof is connected, via the load switch 143, to the output line 141 and the third output unit 106. One end of the load resistor 142-2 is connected to the power supply VDD, and the other end thereof is connected, via the load switch 144, to the output line 141 and the third output unit 106. In the present embodiment, the load unit 102 functions as a reference signal output unit.

Although in the present embodiment the output unit 106 is configured such that the differential amplifier 145 functions as a voltage follower, the output unit 106 may be configured in different manners.

Figure 2:
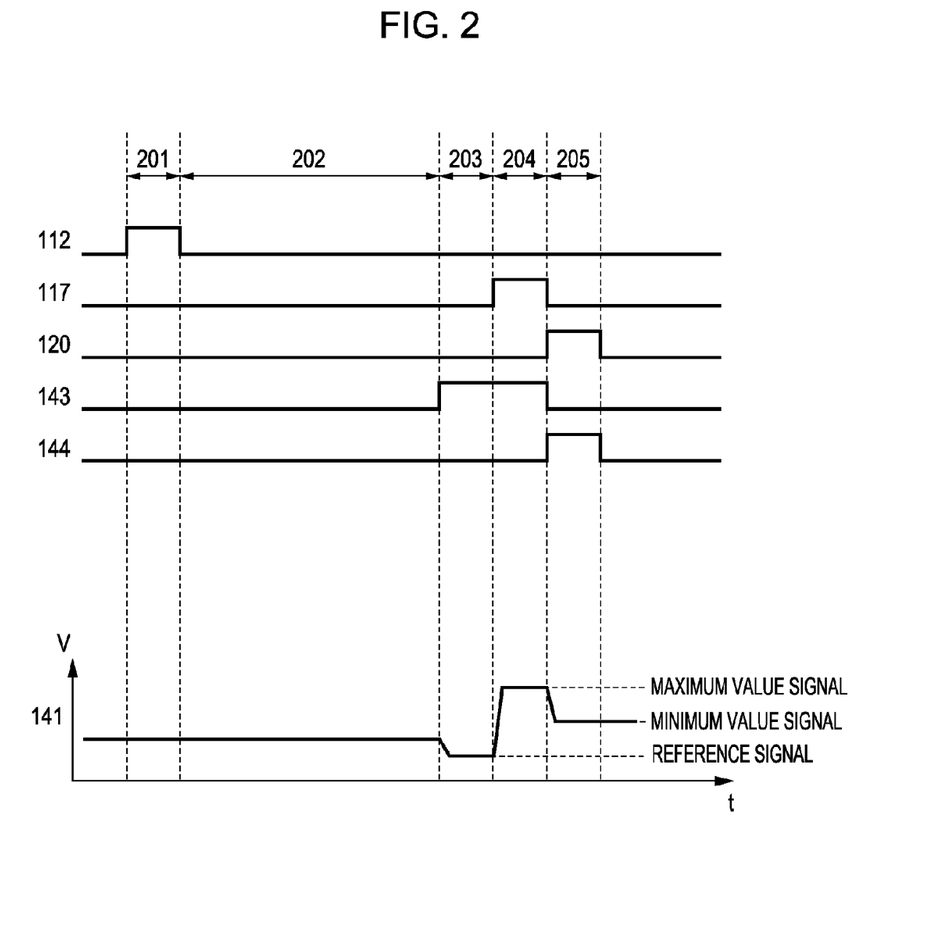
FIG. 2 is a timing chart associated with an photoelectric conversion apparatus according to an embodiment of the present invention.

Next, with reference to FIG. 2, an operation of the photoelectric conversion apparatus 100 is described.

Figure 1:
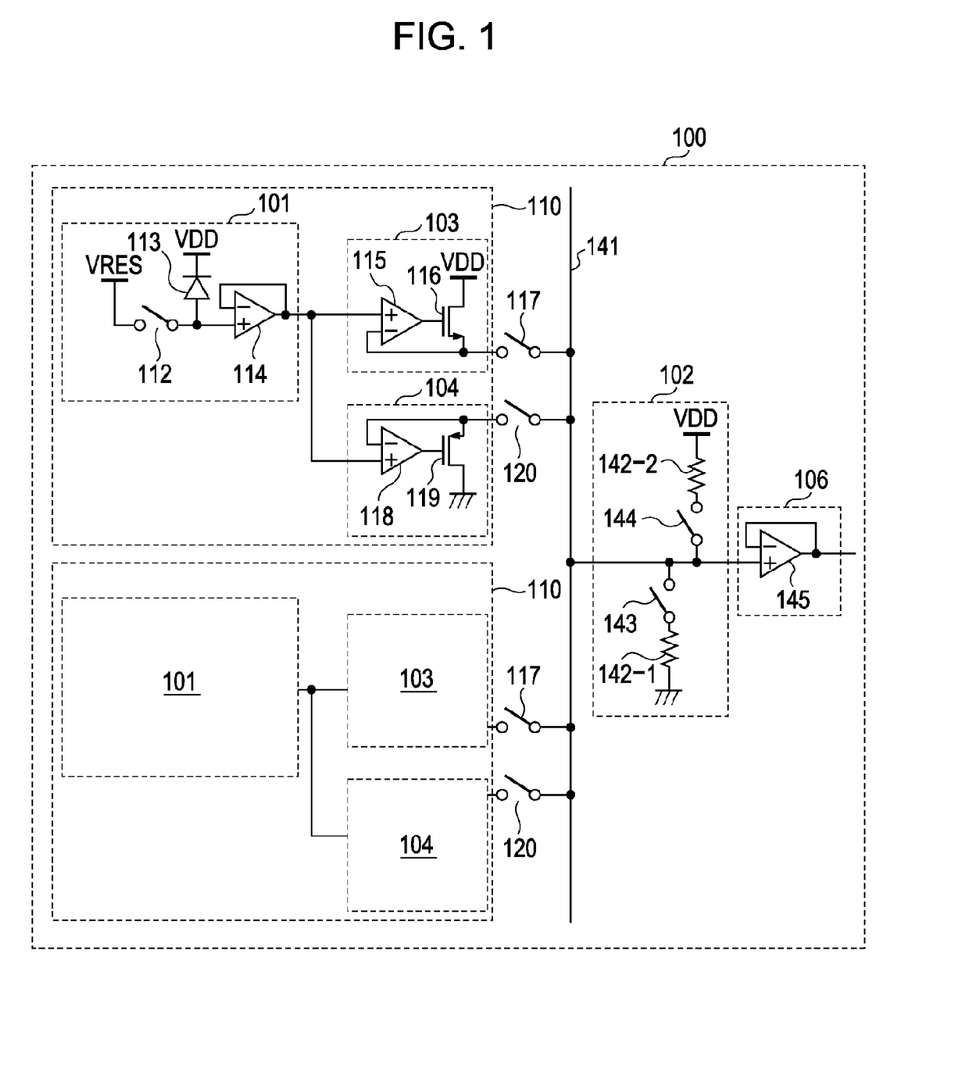
FIG. 1 is a circuit diagram of an photoelectric conversion apparatus according to an embodiment of the present invention.

In a timing chart shown in FIG. 2, reference numerals 112, 117, 120, 143, and 144 denote control signals applied to switches denoted by the same reference numerals shown in FIG. 1. Note that in the present description, the same reference numerals are used to denote control signals and corresponding switches as long as no confusion occurs. Each switch turns on when a high-level control signal is applied thereto, while each switch turns off in response to a low-level control signal applied thereto. In FIG. 2, reference numeral 141 denotes a voltage of the output line 141 shown in FIG. 1. Note that in the operation described below, it is assumed that the switches 112, 117, and 120 are controlled in common for one line of pixels.

First, in a reset period 201, the switch 112 is turned on thereby resetting the anode of the photoelectric conversion element 113, i.e., the non-inverting input terminal of the differential amplifier 114, by the power supply VRES.

In a following accumulation period 202, the switch 112 is turned off while the switches 117, 120, 143, and 144 are all maintained in the off-state. In this period, if the photoelectric conversion element 113 receives light, a charge is generated as a result of a photoelectric conversion performed by the photoelectric conversion element 113. As a result, the anode potential of the photoelectric conversion element 113 increases.

In a reference signal detection period 203, the load switch 143 is turned on thereby connecting the output line 141 to the ground GND via the load switch 143 and the load resistor 142-1. In this state, the electric potential of the output line 141 is output as a reference signal from the third output unit 106 of the photoelectric conversion apparatus 100.

Next, in a maximum value detection period 204, the maximum value detection switch 117 is turned on while the load switch 143 is maintained in the on-state. In this period, the maximum value detection NMOS transistor 116 and the load resistor 142-1 form a common-drain amplifier. In this state, the switches 117 of one line are all turned on, and thus only the maximum value detection NMOS transistor 116 of the first output unit 103 connected to a pixel with the highest electric potential among all pixels 101 of the one line is turned on. Thus, the maximum value of signals output from the pixels 101 of the one line appears on the output line 141. As a result, the electric potential on the output line 141 in this state is output as the maximum value from the third output unit 106 of the photoelectric conversion apparatus 100.

Thereafter, in a minimum value detection period 205, the switches 117 and 143 are turned off, and the switches 120 and 144 are turned on. In this period, the minimum value detection PMOS transistor 119 and the load resistor 142-2 form a common-drain amplifier. In this state, the switches 120 of one line are all turned on, but only the minimum value detection PMOS transistor 119 of the second output unit 104 connected to a pixel with the lowest electric potential among all pixels 101 of the one line is turned on. Thus, the minimum value of signals output from the pixels 101 of the one line appears on the output line 141. As a result, the electric potential on the output line 141 in this state is output as the minimum value from the third output unit 106 of the photoelectric conversion apparatus 100.

In the above-described operation of the photoelectric conversion apparatus 100, the output line 141 is charged and discharged by a current as described below. In the present embodiment, the output line 141 is set to have a reference signal with a low electric potential during the reference signal detection period 203. Thereafter, in the maximum value detection period 204, the electric potential of the output line 141 rises. In the following minimum value detection period 205, the electric potential of the output line 141 falls down. Note that in this operation, during the maximum value detection period 204, the output line 141 is charged by a source current flowing through the maximum value detection NMOS transistor 116. On the other hand, during the minimum value detection period 205, the output line 141 is discharged by a sink current flowing through the minimum value detection PMOS transistor 119.

In the photoelectric conversion apparatus, it is important that a signal can be detected with high accuracy. The output line 141 has high impedance although it is not shown in the figures. Therefore, when the output current is high, the high impedance and the high current flowing through the output line 141 can create a high voltage drop, which can lead to an offset voltage which in turn can cause a reduction in detection accuracy of the signal. Therefore, to achieve sufficiently high accuracy in signal detection, there is an upper limit on the current allowed to flow through the output line 141 in a settled state (described below) in which the signal is output from the third output unit. In the photoelectric conversion apparatus, it is also important to minimize power consumption. This condition may make it difficult to increase the current flowing through the output line 141 in the settled state. Thus, the load resistor 142 is to have resistance high enough to satisfy the above conditions.

For the reasons described above, the maximum allowable current is greater for the maximum value detection NMOS transistor 116 or the minimum value detection PMOS transistor 119 than for the load resistors 142. This makes it possible to quickly charge and discharge the output line 141 by using the current flowing through the transistor 116 or 119 in the maximum value detection period or the minimum value detection period.

Instead of using the load resistors 142, constant current sources may be used to achieve the benefit of the present invention. In a case where the photoelectric conversion apparatus is formed on a semiconductor substrate, because of various constraints such as a limited size of the substrate, it is difficult to increase the current flowing through the constant current sources, and thus it is difficult to quickly charge and discharge the output line 141 using the constant current sources. In this regard, in the present embodiment of the invention, it is possible to enhance the response speed of the signal output by charging and discharging the output line 141 using the current flowing through the maximum value detection transistor or the minimum value detection transistor.

In the embodiment described above, by way of example, it is assumed that the maximum value signal has a higher level than the reference signal. However, there is no restriction on the relative levels of these signals. For example, in a case where the switch 144 is turned on instead of the switch 143 during the reference signal detection period 203, the reference signal has a higher electric potential than the maximum value signal. In this case, the above-described operation in the minimum value detection period is performed after the reference signal detection period, and then the operation in the maximum value detection period is performed. Even when the operation is performed in this order, the output line 141 is charged and discharged by the source current or the sink current flowing through the transistor 116 or 119, and thus the charging and discharging of the output line 141 are performed at a high speed.

Second Embodiment

Figure 3:
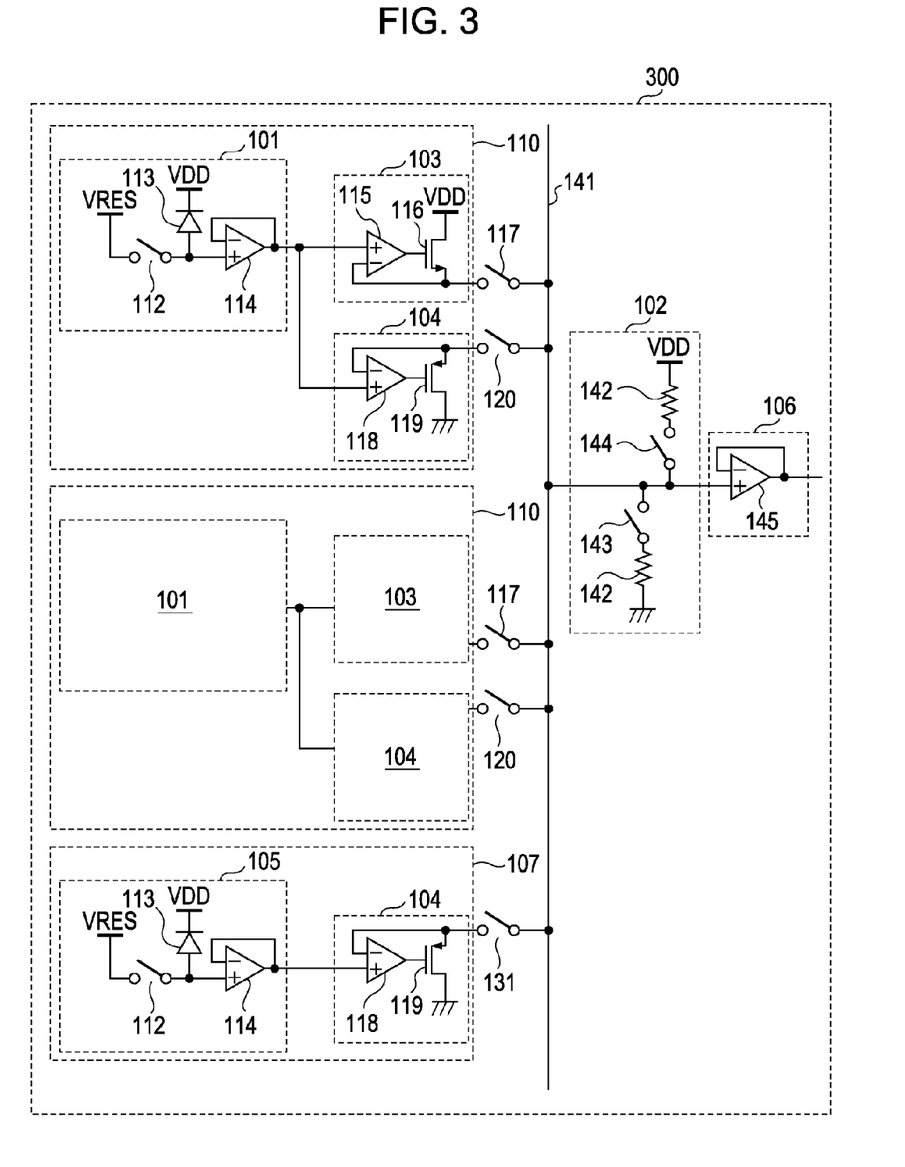
FIG. 3 is a circuit diagram of an photoelectric conversion apparatus according to an embodiment of the present invention.

A second embodiment of the present invention is described below with reference to FIGS. 3 and 4.

A photoelectric conversion apparatus 100 according to the second embodiment is different from that shown in FIG. 1 in that the photoelectric conversion apparatus 100 additionally has a light-shielded pixel 105 and a light-shielded pixel output unit 107. The elements same as those shown in FIG. 1 are denoted by the same reference numerals, and the following explanation will focus on differences.

The light-shielded pixel 105 is the same in equivalent circuit to the pixel 101. However, in the light-shielded pixel 105, the photoelectric conversion element 113 is shielded such that light does not reach the photoelectric conversion element 113. The light-shielded pixel output unit 107 is configured in a similar manner to the second output unit 104. In the present embodiment, the light-shielded pixel output unit 107 functions as the reference signal output unit.

Next, referring to FIG. 4, an operation is described below. The operation is performed differently in the reference signal detection period 403 from the operation according to the first. In the operation according to the first embodiment, the load switch 143 is turned on in the reference signal detection period 203 thereby setting the output line 141 to the reference electric potential. In the present embodiment, in contrast, the output line 141 is set to the reference electric potential by the output from the light-shielded pixel output unit 107. For this purpose, the switches 131 and 144 are turned on in the reference signal detection period 403.

No light is incident on the photoelectric conversion element 113 of the light-shielded pixel 105, and thus the light-shielded pixel 105 has a lower electric potential than the maximum value or the minimum value. Therefore, as shown in FIG. 4, when the operation is performed in the order the reference signal reading period, the maximum value detection period, and the minimum value detection period, the output line 141 is charged and discharged not by the load resistor but by the source current flowing through the transistor 116 or the sink current flowing through the transistor 119. As a result, it is possible to enhance the response speed of the signal output.

The present embodiment provides a unique benefit, in addition to other benefits, that use of the signal output from the light-shielded pixel as the reference signal makes it possible to compensate for a dark current generated in the photoelectric conversion element 113. In this case, the reference signal includes a dark current component which cancels out a dark current component included in the maximum value and the minimum value signal, and thus it is possible to improve the accuracy of focus when the photoelectric conversion apparatus is used as an AF sensor.

Figure 4:
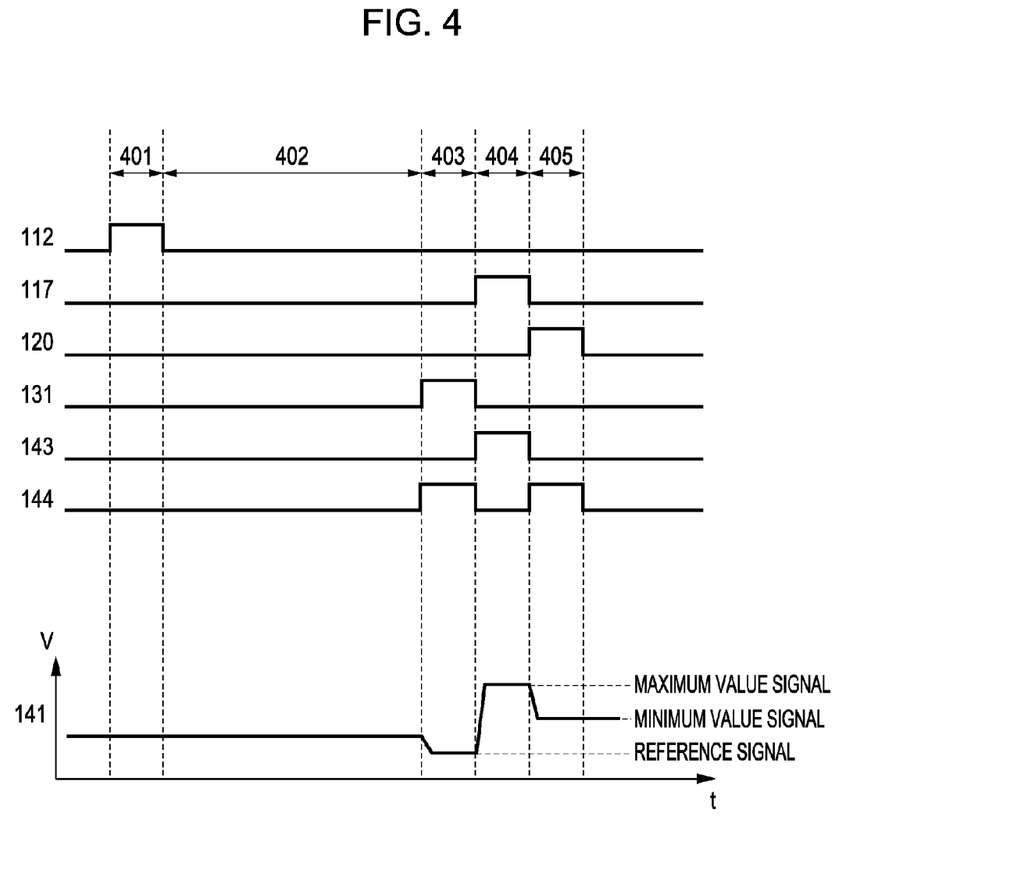
FIG. 4 is a timing chart associated with an photoelectric conversion apparatus according to an embodiment of the present invention.

In FIG. 2 or 4, the output line 141 is in an unsettled state of the electric potential until the reference signal detection period starts in which the electric potential has a settled value. In the present embodiment, if the electric potential in the unsettled state is higher than the reference signal level set by the reference signal output unit, the output line 141 is discharged by the PMOS transistor 119 in the light-shielded pixel output unit 107, and thus a higher operation speed than the first embodiment is achieved.

As in the case of the first embodiment, the load resistor 142 may be replaced with a constant current source.

Third Embodiment

Figure 5:
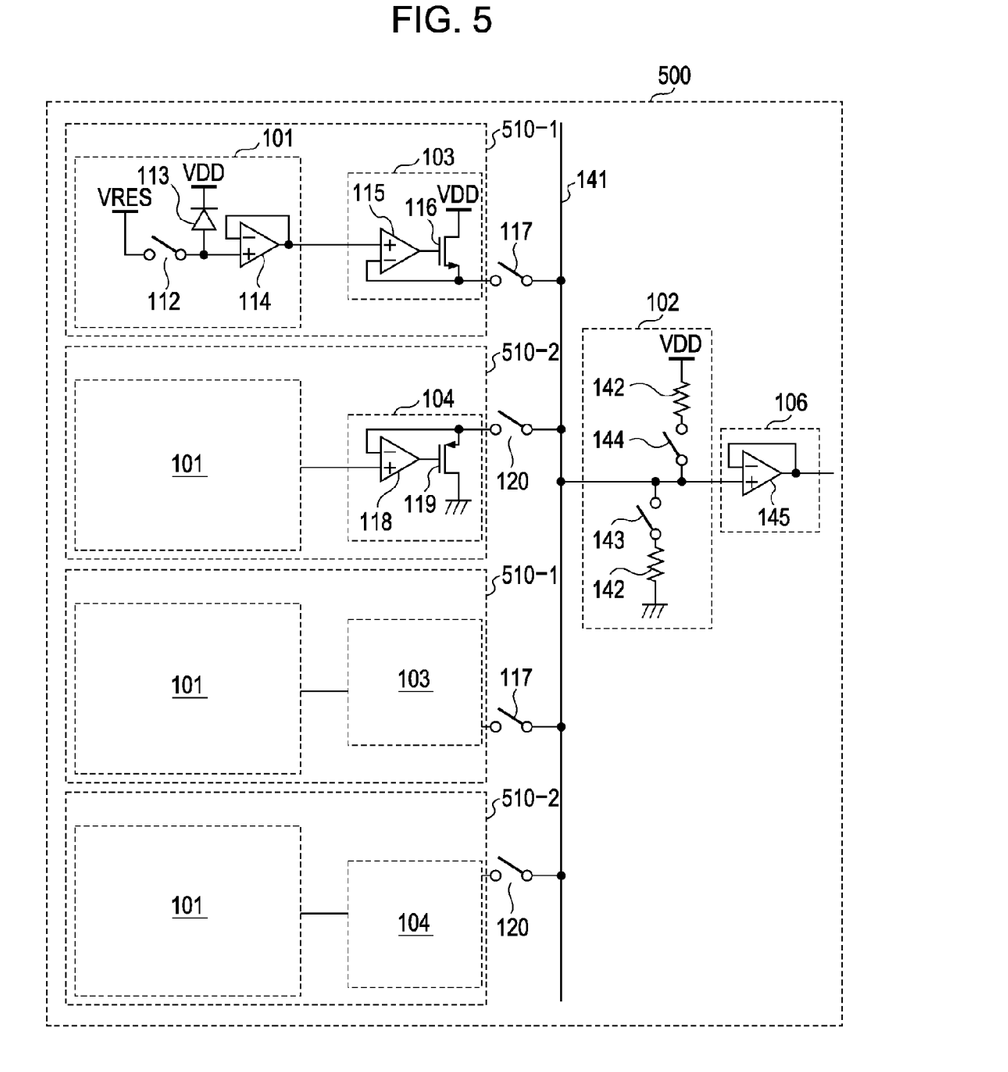
FIG. 5 is a circuit diagram of an photoelectric conversion apparatus according to an embodiment of the present invention.

A third embodiment of the present invention is described below with reference to FIG. 5.

This embodiment is different from the first embodiment in that pixels 101 whose output unit includes only first output unit 103 and pixels 101 whose output unit includes only second output unit 104 are alternately arranged. In this configuration, the number of switches 117 and the number of switches 120 connected to the output line 141 are one-half those used in the first embodiment, which leads to a reduction in parasitic impedance associated with the output line 141, which allows an increase in response speed of the signal output.

The photoelectric conversion apparatus 500 operates in the same manner as described above with reference to the timing chart shown in FIG. 2, although a further detailed description is not given here. Note that in the present embodiment, approximate values of the maximum value and the minimum value for one line are detected from signals obtained from every other pixel.

In the present embodiment, as described above, the parasitic impedance is reduced by reducing the number of first output units and second output units whereby a further increase in response speed of the signal output is achieved. Furthermore, compared with the first embodiment, smaller occupation areas are used for the first and second output units, which allows a reduction in size of the photoelectric conversion apparatus.

In the present embodiment, as in the second embodiment, a light-shielded pixel may be used to provide the reference signal.

Fourth Embodiment

A fourth embodiment of the present invention is described below with reference to FIGS. 6 and 7.

Figure 6:
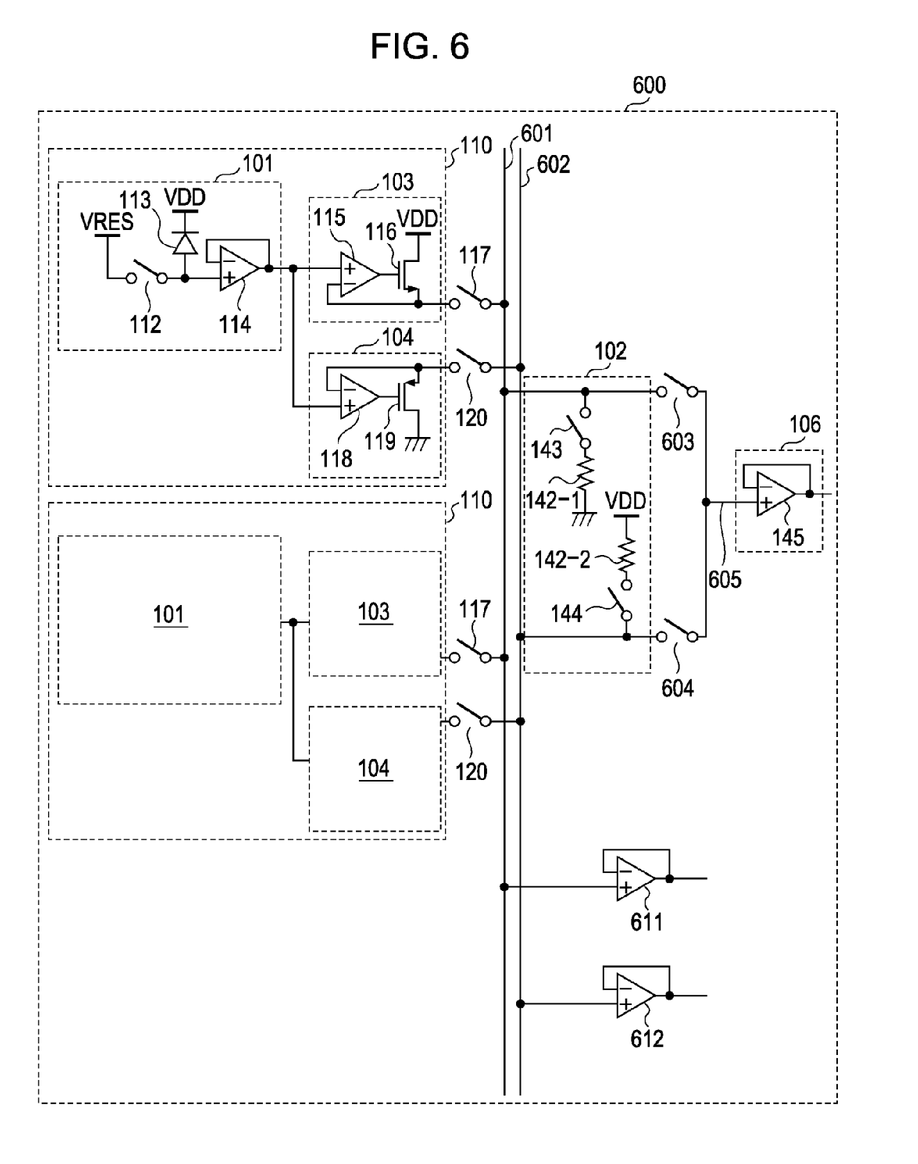
FIG. 6 is a circuit diagram of an photoelectric conversion apparatus according to an embodiment of the present invention.

In a photoelectric conversion apparatus 600 shown in FIG. 6, the same elements to those shown in FIG. 1 are denoted by the same reference numerals, and the following explanation will focus on the differences.

In the first embodiment, all first and second output units are connected to the output line 141. In contrast, in the present embodiment, a maximum value output line 601 and a minimum value output line 602 are provided and only first output units 103 are connected to the maximum value output line 601 and only second output units 104 are connected to the minimum value output line 602. Furthermore, a maximum value output unit 611 is connected to the maximum value output line 601 while a minimum value output unit 612 is connected to the minimum value output line 602. A load resistor 142-1 is connected to the maximum value output line 601 via a load switch 143, and also connected to a common output line 605 via an output value output switch 603. A load resistor 142-2 is connected to the minimum value output line 602 via a load switch 144 and also connected to the common output line 605 serving as a signal output line via a minimum value output switch 604.

Figure 7:
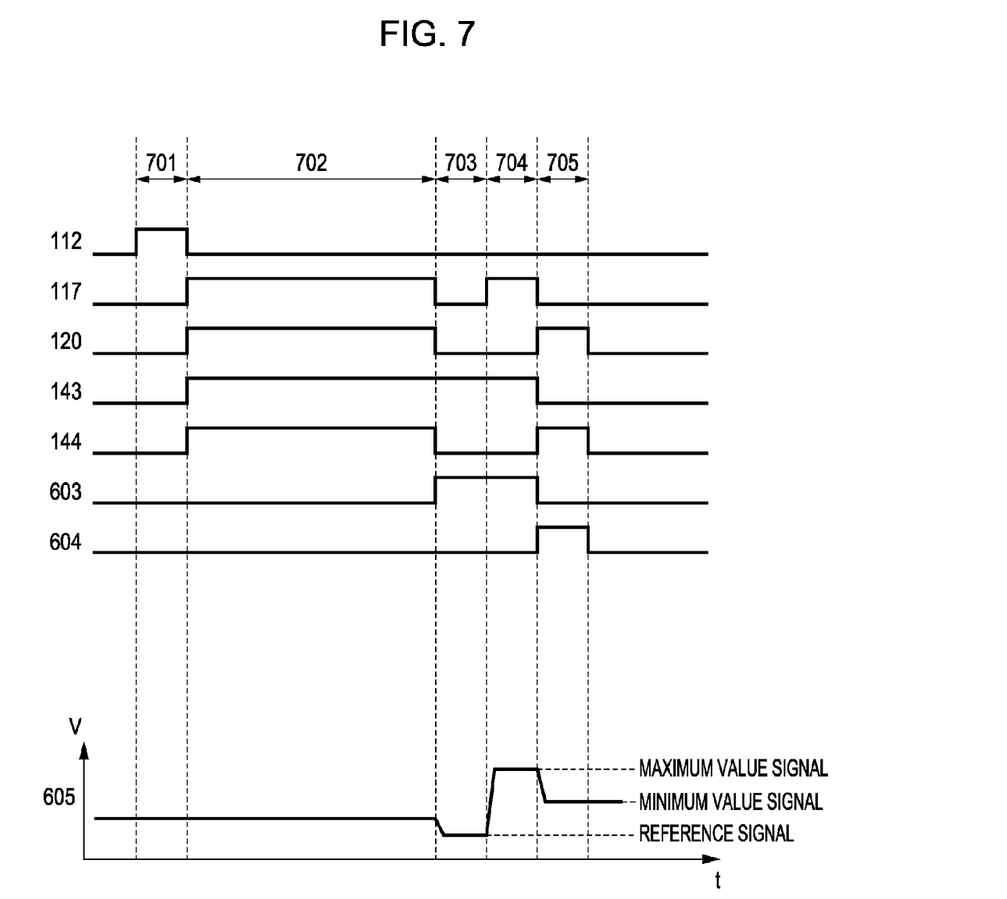
FIG. 7 is a timing chart associated with an photoelectric conversion apparatus according to an embodiment of the present invention.

Next, with reference to FIG. 7, an operation of the photoelectric conversion apparatus 600 is described. In FIG. 7, reference numerals 112, 117, 120, 143, 144, 603, and 604 denote control signals applied to switches denoted by the same reference numerals shown in FIG. 6. As with the first embodiment, the control signals are supplied from a control unit that is not shown in FIG. 7. Each switch turns on when a high-level control signal is applied thereto, while each switch turns off when a low-level control signal is applied thereto. In FIG. 7, reference numeral 605 denotes the electric potential of the common output line 605. Note that in the operation described below, it is assumed that the switches 112, 117, and 120 are controlled in common for one line of pixels.

First, in a reset period 701, the switch 112 is turned on thereby resetting the anode of the photoelectric conversion element 113, i.e., the non-inverting input terminal of the differential amplifier 114, by the power supply VRES.

In a following accumulation period 702, the switch 112 is turned off and the switches 117, 120, 143, and 144 are turned on. In this period, if the photoelectric conversion element 113 receives light, a charge is generated as a result of a photoelectric conversion performed by the photoelectric conversion element 113. As a result, the anode potential of the photoelectric conversion element 113 increases. In this accumulation period 702, the switches 117, 120, 143, and 144 are in the on-state and thus only the maximum value detection NMOS transistor 116 of the first output unit 103 connected to a pixel with the highest electric potential among all pixels 101 of the one line is turned on. That is, in the accumulation period 702, a maximum value signal for one line of pixels 101 is provided in real time from the maximum value output unit 611, while a minimum value signal for the one line of pixels 101 is provided in real time from the minimum value output unit 612.

In the reference signal detection period 703, the switch 143 is maintained in the on-state while the switches 117, 120, and 144 are turned off and the switch 603 is turned on. As a result, the first output unit 103 is electrically disconnected from the maximum value output line 601, and the maximum value output line 601 is connected to the ground GND via the load switch 143 and the load resistor 142-1 and also connected to the common output line 605. In this state, the electric potential of the common output line 605 is output as a reference signal from the third output unit 106 of the photoelectric conversion apparatus 600.

In the maximum value detection period 704, the switch 143 and the switch 603 are maintained in the on-state, and the switch 117 is turned on. In this period, the maximum value detection NMOS transistor 116 and the load resistor 142-1 form a common-drain amplifier. In this state, the switches 117 of one line are all turned on, but only the maximum value detection NMOS transistor 116 of the first output unit 103 connected to a pixel with the highest electric potential among all pixels 101 of the one line is turned on. Thus, the maximum value of signals output from the pixels 101 of the one line appears on the common output line 605. As a result, the electric potential on the common output line 605 in this state is output as the maximum value from the third output unit 106 of the photoelectric conversion apparatus 600.

Thereafter, during the minimum value detection period 705, the switches 117, 143, and 603 are turned off, while the switches 120, 144, and 604 are turned on. In this period, the minimum value detection PMOS transistor 119 and the load resistor 142-2 form a common-drain amplifier. In this state, the switches 120 of one line are all turned on, but only the minimum value detection PMOS transistor 119 of the second output unit 104 connected to a pixel with the lowest electric potential among all pixels 101 of the one line is turned on. Thus, the minimum value of signals output from the pixels 101 of the one line appears on the common output line 605. In this minimum value detection period 705, the turning-on of the switch 604 causes the photoelectric conversion apparatus 600 to output the electric potential on the common output line 605 in this state as the minimum value from the third output unit 106.

The present embodiment allows to monitor in real time the maximum value signal and the minimum value signal in the accumulation period, and thus it is possible to easily determine the accumulation time based on the maximum value signal and the minimum value signal and determine the gain for the signals detected in the maximum value detection period and the minimum value detection period.

Also in the present embodiment, charging and discharging of the common output line 605 in the maximum value detection period or the minimum value detection period are performed by the source current flowing through the maximum value detection NMOS transistor 116 or the sink current flowing through the minimum value detection PMOS transistor 119. This makes it possible to quickly charge and discharge the common output line 605, and thus an increase in response speed of the signal output is achieved.

In the photoelectric conversion apparatus 600 according to the present embodiment, as in the second embodiment, a light-shielded pixel may be used to detect the reference signal.

Fifth Embodiment

A fifth embodiment of the present invention is described below with reference to FIGS. 8 and 9.

Figure 8:
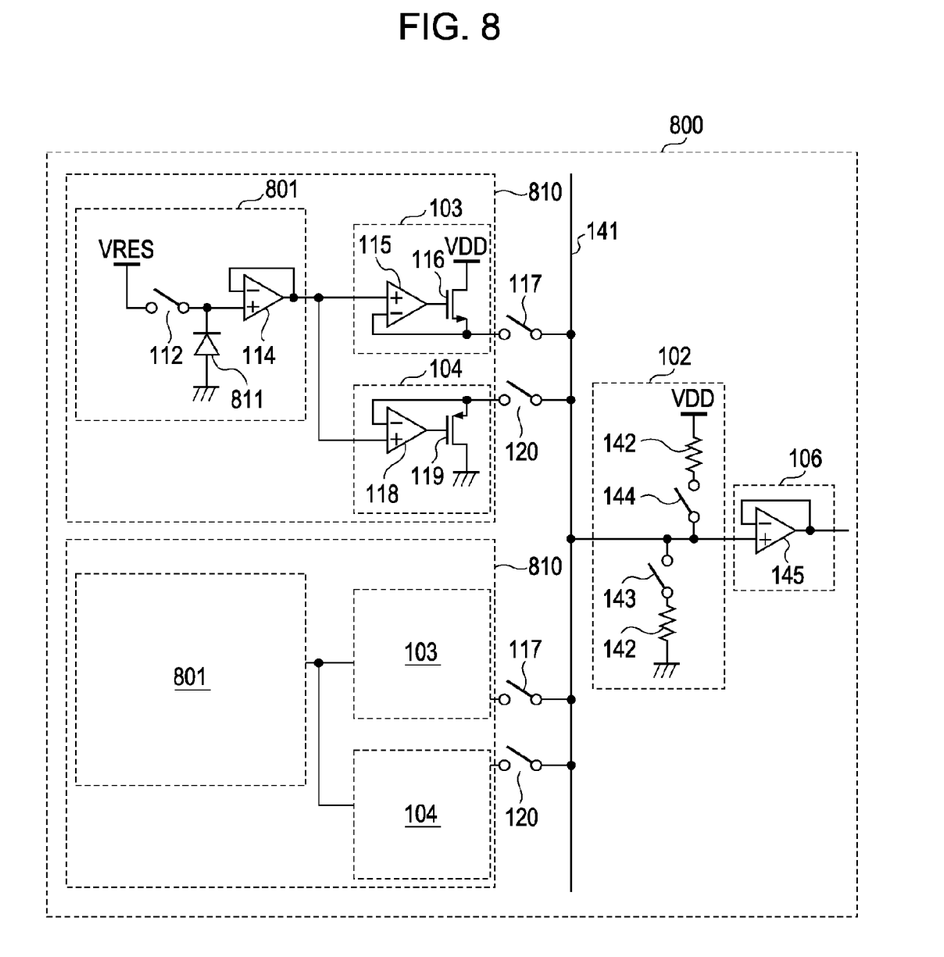
FIG. 8 is a circuit diagram of an photoelectric conversion apparatus according to an embodiment of the present invention.

In a photoelectric conversion apparatus 800 shown in FIG. 8, the same elements to those shown in FIG. 1 are denoted by the same reference numerals, and the following explanation will focus on the differences.

The photoelectric conversion apparatus 800 according to the present embodiment is different from the photoelectric conversion apparatus 100 according to the first embodiment in that unlike the pixel 101 in which the non-inverting input terminal of the differential amplifier 114 is connected to the anode of the photoelectric conversion element 113, the pixel 801 is configured such that a cathode of a photoelectric conversion element 811 is connected to a non-inverting input terminal of a differential amplifier 114. In this configuration, when the photoelectric conversion element 811 receives light, the electric potential of the non-inverting input terminal of the differential amplifier 114 decreases.

Figure 9:
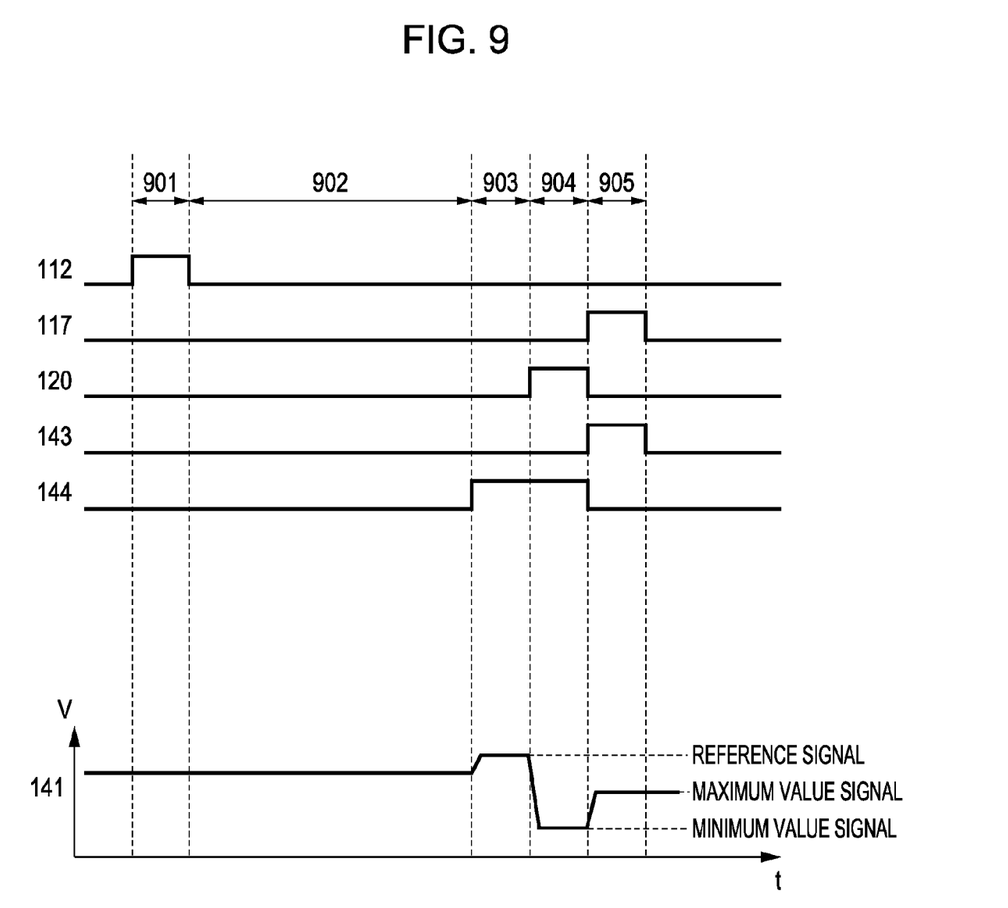
FIG. 9 is a timing chart associated with an photoelectric conversion apparatus according to an embodiment of the present invention.

Next, with reference to FIG. 9, an operation of the photoelectric conversion apparatus 800 is described. The following explanation will focus on differences from the operation described above with reference to FIG. 2. Main differences are in that a load switch 144 is in the on-state during a reference signal detection period 903 and after the reference signal detection period 903, a minimum value detection period 904 and then maximum value detection period 905 follow. Also in the present embodiment, in the minimum value detection period 904 and the maximum value detection period 905, an output line 141 serving as a signal output line is charged and discharged by a source current flowing through a transistor 116 and a sink current flowing through a transistor 119. Thus, the charging and discharging of the output line 141 are performed at a high speed. As a result, it is possible to enhance the response speed of the signal output.

The photoelectric conversion apparatus may be used in an image pickup system that will be described later. In a case where the photoelectric conversion apparatus 100 according to the first embodiment does not match the image pickup system of an input range of a circuit disposed at a following stage, the photoelectric conversion apparatus 800 according to the present embodiment may be used. That is, it is possible to enhance the response speed of the signal output while configuring the photoelectric conversion apparatus in a flexible manner depending on requirements for the image pickup system.

Also in the photoelectric conversion apparatus 800 according to the present embodiment, as in the second embodiment, a light-shielded pixel may be used to detect the reference signal.

Sixth Embodiment

Figure 10:
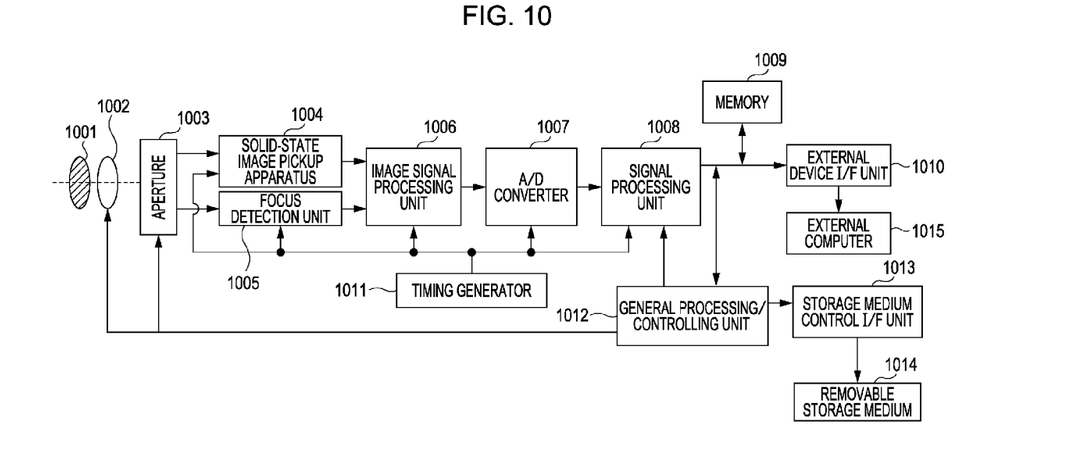
FIG. 10 is a block diagram illustrating an image pickup system according to an embodiment of the present invention.

FIG. 10 illustrates an example of a configuration of an image pickup system according to a sixth embodiment of the present invention. This image pickup system includes a photoelectric conversion apparatus according to one of the first to fifth embodiments described above embedded in a digital camera. Reference numeral 1001 denotes a barrier serving as a main switch and also as a protector for a lens described below. Reference numeral 1002 denotes the lens that forms an optical image of an object on a solid-state image pickup apparatus 1004. Reference numeral 1003 denotes an aperture for adjusting the amount of light passing through the lens. Note that the solid-state image pickup apparatus 1004 is configured to capture an image signal of the optical image formed via the lens. Reference numeral 1005 denotes a focus detection unit including a photoelectric conversion apparatus (serving as an AF sensor) according to one of the first to fifth embodiments of the invention.

Reference numeral 1006 denotes an image signal processing apparatus configured to process signals received from the solid-state image pickup apparatus 1004 or the focus detection unit 1005. Reference numeral 1007 denotes an analog-to-digital converter configured to convert the signal output from the image signal processing unit 1006 into a digital signal. Reference numeral 1008 denotes a signal processing unit configured to process image data output from the analog-to-digital converter 1007 in terms of various corrections, data compression, etc.

Reference numeral 1009 denotes a memory for temporarily storing image data. Reference numeral 1010 denotes an external device interface unit for communicating with an external device such as a computer. Reference numeral 1011 denotes a timing generator configured to output various timing signals to the signal processing unit 1008 and other units. Reference numeral 1012 denotes a general processing/controlling unit that performs various calculations and controls the whole camera. Reference numeral 1013 denotes a storage medium control interface unit. Reference numeral 1014 denotes a removable storage medium such as a semiconductor memory for storing and reading data. Reference numeral 1015 denotes an external computer.

Next, a description is given below as to an operation performed by the digital camera to take an image. If the barrier 1001 is opened, a main power supply is turned on. Subsequently, power to a control system is turned on and then power to an image capturing circuit including the analog-to-digital converter 1007 and the like is turned on. Next, based on a signal output from the focus detection unit 1005, the general processing/controlling unit 1012 calculates the distance to a subject by using a phase difference detection scheme as described above. The general processing/controlling unit 1012 then drives the lens 1002 and determines whether an in-focus state is achieved. If it is determined that the in-focus state is not achieved, the auto focusing operation is continued by driving the lens 1002. If the in-focus state is achieved, an exposure operation is started. After the exposure operation is completed, an image signal output from the solid-state image pickup apparatus 1004 is converted by the analog-to-digital converter 1007 into digital data and processed by the signal processing unit 1008. The resultant digital data is stored by the general processing/controlling unit 1012 into the memory 1009. Thereafter, under the control of the general processing/controlling unit 1012, the data stored in the memory 1009 is stored in the removable storage medium 1014 via the storage medium control interface unit 1010. The data may be supplied to a computer or the like via the external device interface unit 1010.

As described above, the image pickup system according to the present embodiment of the invention includes the photoelectric conversion apparatus according to one of the first to fifth embodiments, and the signal processing unit that processes the signal output from the photoelectric conversion apparatus.

In the embodiments described above, by way of example, the maximum value detection NMOS transistor 116 and the minimum value detection PMOS transistor 119 are used. However, in the present invention, transistors are not limited to MOS transistors. For example, an NPN transistor may be used instead of the maximum value detection NMOS transistor 116, and a PNP transistor may be used instead of the minimum value detection PMOS transistor 119. That is, the first and second output units may be configured using either a common-drain MOS transistor or a common-collector bipolar transistor such that the signal output line is charged and discharged by the current flowing through these transistors whereby an improvement in response speed of the signal output is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-219219 filed Sep. 24, 2009, which is hereby incorporated by reference herein in its entirety.

What is claimed is:

1. A driving method of an apparatus;
wherein the apparatus has
a plurality of pixel output units each including a pixel configured to output a signal in response to incident light and including first and second output units;
an output line coupled to each of a plurality of first output units and to a plurality of second output units;
wherein each first output unit includes a first transistor that functions to raise an electric potential of the output line in accordance with an output from the pixel; and
each second output unit includes a second transistor that functions to lower the electric potential of the output line in accordance with the output from the pixel;
wherein the method comprises:
setting the electric potential of the output line to a reference signal level; thereafter, raising the electric potential of the output line by the first transistor; and
thereafter, lowering the electric potential of the output line by the second transistor.

2. The method according to claim 1, wherein
each of the first transistors is connected to the output line via a respective first switch, and
each of the second transistors is connected to the output line via a respective second switch;
wherein
the raising includes turning on a plurality of the first switches; and
the lowering includes turning on a plurality of the second switches.

3. A driving method of an apparatus; wherein the apparatus has
a plurality of pixel output units each including a pixel configured to output a signal in response to incident light and including first and second output units;
an output line coupled to each of a plurality of first output units and to a plurality of second output units;
wherein each first output unit includes a first transistor that functions to raise an electric potential of the output line in accordance with an output from the pixel; and
each second output unit includes a second transistor that functions to lower the electric potential of the output line in accordance with the output from the pixel; wherein the method comprises:
setting the electric potential of the output line to a reference signal level; thereafter, lowering the electric potential of the output line by the second transistor; and
thereafter, raising the electric potential of the output line by the first transistor.

4. The method according to claim 3, wherein
each of the first transistors is connected to the output line via a respective first switch, and
each of the second transistors is connected to the output line via a respective second switch;
wherein
the lowering includes turning on a plurality of the second switches; and
the raising includes turning on a plurality of the first switches.

5. An apparatus comprising:
a plurality of pixel output units each including a pixel configured to output a signal in response to incident light and including first and second output units;
an output line coupled to a plurality of first output units and to a plurality of second output units;
a reference output unit configured to output a reference signal to the output line; and
a control unit configured to control an operation of the plurality of pixel output units and an operation of the reference output unit;
wherein each first output unit includes a first transistor that functions to raise an electric potential of the output line in accordance with an output from the pixel; and
each second output unit includes a second transistor that functions to lower the electric potential of the output line in accordance with the output from the pixel;
and wherein the control unit controls the operation such that:
the reference signal output unit outputs the reference signal to the output line;
thereafter, the plurality of first transistors output a signal with a higher level than the reference signal; and
thereafter, the plurality of second transistors output a signal with a lower level than the signal output from the first transistor.

6. The apparatus according to claim 5, wherein the first transistor or the second transistor is one of a common-drain MOS transistor and a common collector bipolar transistor.

7. The apparatus according to claim 5, wherein each of the first transistors is a common-drain MOS transistor or a common-collector bipolar transistor, and each of the second transistors is a common-drain MOS transistor or a common-collector bipolar transistor.

8. The apparatus according to claim 5, wherein the reference output unit includes a photoelectric conversion element shielded from light.

9. A system comprising:
the apparatus according to claim 5; and
a processing unit configured to process a signal output from the apparatus.

10. An apparatus comprising:
a plurality of pixel output units each including a pixel configured to output a signal in response to incident light and including first and second output units;
an output line coupled to a plurality of first output units and to a plurality of second output units;

a reference output unit configured to output a reference signal to the output line; and a control unit configured to control an operation of the plurality of pixel output units and an operation of the reference output unit;

wherein each first output unit includes a first transistor that functions to raise an electric potential of the output line in accordance with an output from the pixel; and each second output unit includes a second transistor that functions to lower the electric potential of the output line in accordance with the output from the pixel;

and wherein the control unit controls the operation such that:

the reference signal output unit outputs the reference signal to the output line;

thereafter, the plurality of second transistors output a signal with a lower level than the signal output from the first transistor; and thereafter, the plurality of first transistors output a signal with a higher level than the reference signal.

11. The apparatus according to claim 10, wherein the first transistor or the second transistor is one of a common-drain MOS transistor and a common collector bipolar transistor.

12. The apparatus according to claim 10, wherein each of the first transistors is a common-drain MOS transistor or a common-collector bipolar transistor, and each of the second transistors is a common-drain MOS transistor or a common-collector bipolar transistor.

13. The apparatus according to claim 10, wherein the reference output unit includes a photoelectric conversion element shielded from light.

14. A system comprising:

the apparatus according to claim 10; and a processing unit configured to process a signal output from the apparatus.

* * * * *